(12) United States Patent
Cirette et al.

(10) Patent No.: US 8,974,211 B2
(45) Date of Patent: Mar. 10, 2015

(54) SYSTEM FOR AIDING IN THE REPLACEMENT OF A MOULD OF A MOULDING UNIT OF A MACHINE FOR MANUFACTURING CONTAINERS

(75) Inventors: Damien Cirette, Octeville sur Mer (FR); Arnaud Prieur, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 0 days.

(21) Appl. No.: 14/003,936

(22) PCT Filed: Mar. 7, 2012

(86) PCT No.: PCT/EP2012/053881
§ 371 (c)(1),
(2), (4) Date: Sep. 9, 2013

(87) PCT Pub. No.: WO2012/120031
PCT Pub. Date: Sep. 13, 2012

(65) Prior Publication Data
US 2014/0004219 A1    Jan. 2, 2014

(30) Foreign Application Priority Data
Mar. 8, 2011    (FR) ...................................... 11 51876

(51) Int. Cl.
*B29C 33/00*    (2006.01)
*B29C 31/00*    (2006.01)
*B29C 49/42*    (2006.01)
(Continued)

(52) U.S. Cl.
CPC ............... *B29C 31/006* (2013.01); *B29C 49/36* (2013.01); *B29C 49/42* (2013.01); *B29C 49/48* (2013.01); *B29C 2049/4856* (2013.01); *B29C 2049/4892* (2013.01)
USPC ........... 425/182; 425/195; 425/522; 425/540; 425/541

(58) Field of Classification Search
CPC ............... B29C 2049/4858; B29C 2049/4864; B29C 2049/4866; B29C 33/306
USPC .......................... 425/182, 195, 522, 540, 541
See application file for complete search history.

(56) References Cited

U.S. PATENT DOCUMENTS 5,683,729 A    11/1997    Valles
6,464,486 B1    10/2002    Barray et al.
(Continued)

FOREIGN PATENT DOCUMENTS

FR    2646802    11/1990
FR    2653058    4/1991
(Continued)

OTHER PUBLICATIONS

International Search Report dated Jun. 13, 2012, corresponding to PCT/EP2012/053881.

*Primary Examiner* — Jacob Thomas Minskey
(74) *Attorney, Agent, or Firm* — Young & Thompson (57) ABSTRACT

A system for aiding in the replacement of a mold in a molding unit of a machine for manufacturing containers, includes at least one transport device (16) for transporting a joined mold (18) forming a transportable unit subassembly, the transport device (16) including at least one robotic arm (96) for positioning, in space along a trihedron (X, Y, Z) and with respect to the molding unit (12), elements (76) for handling at least one joined mold (18) so as to carry out a replacement of the at least one mold (18) of the molding unit (12).

20 Claims, 4 Drawing Sheets

(51) Int. Cl.
*B29C 49/48* (2006.01)
*B29C 49/36* (2006.01)

(56) References Cited

U.S. PATENT DOCUMENTS

| | | |
|---|---|---|
| 2005/0238753 A1 | 10/2005 | Arakelyan et al. |
| 2010/0310705 A1 | 12/2010 | Schoenberger et al. |
| 2011/0052744 A1 | 3/2011 | Meinzinger et al. |
| 2012/0135101 A1 | 5/2012 | Blanchard |

FOREIGN PATENT DOCUMENTS

| | | |
|---|---|---|
| FR | 2659265 | 9/1991 |
| FR | 2709264 | 3/1995 |
| FR | 2764544 | 12/1998 |
| FR | 2796588 | 1/2001 |
| FR | 2843714 | 2/2004 |
| FR | 2949703 | 3/2011 |
| WO | 96/33059 | 10/1996 |
| WO | 2008/132090 | 11/2008 |

SYSTEM FOR AIDING IN THE REPLACEMENT OF A MOULD OF A MOULDING UNIT OF A MACHINE FOR MANUFACTURING CONTAINERS

BACKGROUND OF THE INVENTION

1. Field of the Invention

The present invention relates to a system for aiding in the replacement of a mold of a molding unit of a machine for manufacturing containers.

The present invention relates more specifically to a system for aiding in the replacement of a mold intended to be used for the replacement of at least one mold of a molding unit equipping a machine for manufacturing containers by the forming, by means of at least one fluid under pressure, of a preform made from a plastic material having been thermally conditioned beforehand.

A unit for molding containers comprises at least:
two mold carriers which are mounted so as to be movable between at least one open position and one closed position of the molding unit, and
a mold comprising at least two molding elements capable of being brought together in order to occupy a joined position, or of being separated in order to occupy a disjoined position, each of the said at least two molding elements of the mold being adapted to be secured in a detachable manner to one of the associated mold carriers by associated securing means, the said associated securing means being adapted to be controlled when the molding unit is in the closed position between at least one securing position and one release position.

2. Description of the Related Art

Already familiar from the prior art are machines for manufacturing containers, in particular for manufacturing bottles, flasks, etc., which containers are obtained by the forming of a preform (or a blank), which, being made of a thermoplastic material such as PET, is thermally conditioned beforehand in an oven.

Replacement of a mold is required in particular in order to be able to proceed to the manufacture of containers having different forms and/or dimensions, or even to their replacement in the event of damage and/or wear to the molding elements.

A distinction is drawn between machines described as "linear" and machines described as "rotary", primarily as a result of their construction and their function in the course of the manufacturing cycle.

Reference is made without limitation, for example, to document WO-2008/132090 for more details, FIG. 1 illustrating schematically a manufacturing machine of the "linear" type.

Reference is similarly made without limitation to documents FR-2.796.588 or FR-2.709.264, in which FIG. 1 respectively illustrate an installation for the manufacture of containers comprising such a "rotary" machine, of which the molding units with book-like opening are supplied by transfer means with the preforms originating from the thermal conditioning oven.

"Rotary" machines for manufacturing containers comprise a variable number of molding units, which are distributed circumferentially on a carousel that is caused to rotate.

In these machines, each molding unit comprises associated means for molding in order to undertake, by means of at least one fluid under pressure, the transformation of one or a plurality of preforms simultaneously on the basis of the number of cavities of the mold.

In a manner known per se, forming of the container from a preform is obtained notably by blowing or by stretch blow-molding utilizing pressurized air.

Reference can also be made, for example, to document FR-2.764.544 for additional details relating to the means of blowing associated with the molding unit, the said means still being referred to as a "blow nozzle".

The machines, known as rotary machines, are equipped with molding units exhibiting specific characteristics, each molding unit comprising in particular mold carriers which are generally mounted so as to be movable about an axis of rotation (and not in translation, as in the case of "linear" machines).

The mold carriers of the molding unit are thus mounted, for example, so as to be movable about an axis of rotation with vertical orientation such that the molding unit opens towards the outside of the carousel of the machine and, because of this movement constraint, a molding unit of this type is referred to as being "in the form of a pocketbook" (or having "book-like opening" in English).

Documents FR-2.659.265 or FR-2.843.714 illustrate embodiments of a molding unit with book-like opening comprising a mold consisting of at least two molding elements (or mold halves), which, provided respectively with a molding half-cavity, are secured to two associated mold carriers in a detachable manner by securing means.

In document FR-2.659.265, the associated securing means formed by screws are adapted to be displaced between at least two positions corresponding respectively to one securing position and to one release position for the molding elements, this being performed manually by at least one operator using an appropriate tool (screwdriver, Allen key) to do so.

Document WO-96/33059 illustrates a further embodiment of a molding unit with book-like opening comprising various refinements that have been brought to such units.

It should be borne in mind, first of all, that, depending on the container to be manufactured, the molding elements in fact consist either simply of two mold halves, or, as depicted in the document, of two mold halves and a separate mold bottom, in particular when the container exhibits a mold bottom of complex form, for example petaloid, capable of presenting problems at the time of demolding.

The construction of the mold of the molding unit then differs in the sense that, by comparison with that of the aforementioned document FR-2.659.265, for example, each molding element (or mold half) is divided into two distinct parts, namely and according to the terminology of this document, on the one hand, a shell holder additionally including means of cooling and, on the other hand, a shell comprising a half-cavity for molding the container.

Shells of this kind are more easily operated by hand by an operator due to their lower weight, thus not requiring the disconnection of the fluid couplings linked to the cooling function and making it possible to optimize the choice of materials for each of the parts according to the performed function, for example the choice of aluminum for the shells.

Each of the shell holders is adapted to be secured in a detachable manner to an associated mold carrier thanks to first securing means, such as screws, while the shell is adapted to be secured in a detachable manner to the shell holder by other rapid securing means distinct from the first securing means.

The position of the rapid securing means between each shell and the associated shell holder means that they are intended to reduce the time required by an operator undertaking the replacement of a mold to release the shell in place from the shell holder at the time of its disassembly, and then to secure the other shell at the time of its assembly.

In a molding unit of this type, the replacement of a mold is undertaken by at least one operator, who, with the molding unit in the open position, proceeds manually to perform the successive disassembly of one and then the other of the shells by maneuvering the said rapid securing means by means of a tool (for example a screwdriver) in order to release them, the same operations being repeated in the opposite direction in order to carry out their securing at the time of installation of each of the other shells.

As a consequence, irrespective of the design of the mold in the molding unit and the associated securing means utilized, there is no doubt that the solutions of the prior art for undertaking the replacement of a mold all call for a succession of a large number of operations to be carried out manually by one or a plurality of operators.

In terms of disassembly, for example, a single operator or occasionally two operators intervene manually on the molding unit in order to proceed successively to opening the molding unit, to releasing the molding element (whether it is a mold half or a shell half), and to removing it by performing a circular movement of the said released molding element from the back towards the front and out of the associated mold carrier, these operations being repeated for the other molding element, to which operations are added, where appropriate, the disassembly of the mold bottom.

It is for this reason that the known solutions for undertaking the replacement of a mold in a molding unit of this kind are not considered satisfactory, in particular because of the considerable time required in order to carry out such a replacement and, in particular, the economic consequences associated with the complete standstill of the manufacturing machine.

Furthermore, in the case of molding units with book-like opening, all the operations—carried out by a single operator or occasionally by two operators for the purpose of undertaking a mold replacement—are made complicated and are slowed down by difficulties associated with access to the molding elements of the mold, since the general environment of such a molding unit with book-like opening only offers greatly reduced accessibility, the distance between the mold carriers in the open position being determined in relation to the final container to be removed from the mold in the operating mode, known as the manufacturing mode.

Furthermore, in a machine, the distance between the mold carriers in the open position is also limited by the space between the mold units, that is to say for a given molding unit, by each of the adjacent molding units situated upstream and downstream, two consecutive molding units not being able to occupy the open position simultaneously without their mold carriers coming into contact.

The length of time required to undertake the replacement of a mold must then be multiplied by the number of molding units comprising the manufacturing machine, which number of molding units with book-like opening lies, for example, between 6 and 34.

The reduction in the time necessary to replace a mold nevertheless remains a high expectation of the users of a machine for the manufacture of containers, in particular users who undertake frequent mold changes.

In fact, the machine in certain cases is not dedicated to the permanent manufacture of a single type of container, but is used to manufacture containers with different capacities and/ or different forms entailing very frequent mold replacements, the attention devoted to the time or replacement of the mold of a molding unit being even greater for that reason alone and on a level with the economic challenges involved.

The immobilization of the machine during these interventions in order to replace the molds represents a major cost element because of the complete shutdown of production by which it is accompanied, and the interventions for replacing the mold are costly as a result.

Thus, the question of reducing the time for replacing the mold of a molding unit arises regardless of the design of the mold, that is to say that the two molding elements are constituted by two mold halves or are each constituted by a shell and shell holder.

BRIEF SUMMARY OF THE INVENTION

The object of the present invention is, in particular, to propose novel solutions enabling a reduction in the time necessary to carry out a replacement of a mold of a molding unit of a machine for manufacturing containers.

With this object in view, the present invention proposes a system for aiding in the replacement of a mold of a molding unit for a machine for manufacturing containers of the type described previously, characterized in that the said system for aiding comprises at least one device for transporting a mold forming a transportable unit subassembly, known as a joined mold, the said device for transporting comprising at least one robotic arm for positioning, in space, with respect to the molding unit and along a trihedron, means for handling at least one joined mold so as to carry out a replacement of the said at least one mold of the said molding unit.

The system for aiding is therefore intended to deal with a molding unit in which each molding element, regardless of the open or closed position of the molding unit, is capable of being released in relation to its associated mold carrier, and in which the said at least two molding elements are adapted to be maintained in the said joined position by means intended to bring them together in order to form temporarily a transportable unit subassembly or the said joined mold.

Thanks to a system for aiding according to the invention, all or at least a part of the operations that are necessary in order to accomplish a replacement of a mold of a molding unit are automated and are carried out simply and rapidly, thanks to which it has proved possible to reduce very considerably the time required for such a replacement of a mold.

By way of example without limitation, the replacement of a mold is carried out with a system for aiding according to the invention in a total time that has been divided by two, or even by four, by comparison with the total time previously necessary with the solutions of the prior art.

Advantageously, a system for aiding according to the invention permits the reduction or the elimination of the manual operations previously carried out by at least one operator and, in so doing, of every direct human intervention on the molding unit of the manufacturing machine.

Advantageously, the invention accordingly permits the elimination of all or part of the difficult manual operations required to replace a mold, to the benefit of the operators in the form of an improvement in their working conditions, a reduction in fatigue and increased safety.

Advantageously, the device for transporting a joined mold comprising, according to the invention, at least one robotic arm is used in combination with an aiding module adapted to bring about selectively at least the opening or the closing of the molding unit in an automated and synchronous manner with the device for transporting, in particular the handling means.

Advantageously, the molding unit is provided with means for securing molding elements to the associated mold carriers which are adapted to be controlled selectively in order to bring about automatically the changes in state between the locked position and the unlocked position, and of which the design additionally permits remote control, in particular by a control unit.

Advantageously, the change in position (or state) between the locked position and the unlocked position of the securing means is achieved in a single operation by control means associated with the securing means, in such a way that the changes in position or state are obtained in a simple and above all rapid manner, as well as simultaneously for the two molding elements, regardless of whether the said controlled means are common or at least double and associated with each molding element.

Thanks to such an aiding module and/or such optimized securing means, the length of time needed to carry out a replacement of a mold is further reduced by the automation of all the operations previously carried out manually by one or a plurality of operators, that is to say the operations which preceded the removal of each molding element (and, where appropriate, the bottom of the mold) in the course of disassembly, and which followed the introduction of each molding element in the course of assembly.

Advantageously, and in combination with an aiding module and optimized securing means, the device for transporting according to the invention makes it possible to achieve the complete automation of all the operations that are carried out successively in order to undertake the replacement of the mold of a molding unit, starting from the operations for releasing and securing molding elements by securing means, involving the control of the opening and closing of the mold carriers of the molding unit (with or without operations of unlocking and locking the molding unit), and in order to complete the operations for the removal and the introduction of the joined mold by the robotic arm.

According to further characteristics of the invention:
- the device for transporting comprises at least one head, which in association with the said robotic arm, comprises the said handling means interacting with at least one joined mold in order to undertake the removal of the said at least one joined mold from the mold carriers in the open position of the molding unit, and/or the insertion of the said at least one joined mold between the said mold carriers in the open position of the molding unit;
- the handling means comprise at least one principal holding device intended to interact with a first part of the joined mold which is accessible to the said principal holding device when the molding unit is in the closed position;
- the said at least one principal holding device consists of a principal gripper adapted to take hold of the said first part of the joined mold;
- the handling means comprise at least one secondary holding device intended to interact with a second part of the joined mold which is accessible when the molding unit is in the open position;
- the said at least one secondary holding device consists of a secondary gripper adapted to take hold of the said second part of the joined mold;
- at least the secondary holding device is mounted so as to be movable between at least one retracted position and one advanced position;
- the system for aiding comprises means adapted to maintain the said at least two molding elements of the said mold which are brought together in the said joined position in order to form the said transportable unit subassembly, known as the joined mold;
- the means intended to bring together the said at least two molding elements of the said joined mold in order to form the joined mold consist of the handling means;
- the head of the device for transporting comprises double handling means which are formed respectively by first handling means and by second handling means;
- the head is mounted rotatably about an axis of rotation in such a way as to position selectively one or other of the said first or second means for handling a joined mold at the time of operations for the replacement of a mold in a molding unit;
- the system for aiding comprises a module for aiding, which, in association with the said device for transporting, comprises means of actuation adapted at least to bring about selectively the opening or the closing of the molding unit;
- the module for aiding of the system comprises means of actuation adapted to control selectively a device for locking the molding unit between a locked position and an unlocked position;
- the system for aiding comprises a control unit adapted for the synchronized guidance of the handling means of the robotic arm of the device for transporting a joined mold and the means for actuating the module for aiding in order to realize the operations for the replacement of a mold in the molding unit in an automated manner.

BRIEF DESCRIPTION OF THE DRAWINGS

Other characteristics and advantages of the present invention will become apparent from a reading of the detailed description which follows, for the understanding of which reference is made to the drawings, in which.

DETAILED DESCRIPTION OF THE PREFERRED EMBODIMENTS

In the further description, the longitudinal, transversal and vertical orientations will be adopted, albeit without limitation, with reference to the trihedron (X, Y, Z) depicted in the figures.

The longitudinal and transversal directions are determined by convention in a fixed manner in relation to the mold carriers of the molding unit, regardless of the open or closed position of the molding unit.

The expressions "front" and "rear" with reference to the longitudinal direction, "left" or "right" with reference to the transversal direction, and "upper" or "lower" with reference to the vertical direction, are used without limitation.

The invention proposes a system 10 for aiding in the replacement of a mold of a molding unit 12 for a machine 14 for manufacturing containers.

A preferred embodiment of the system 10 for aiding in the replacement of a mold and, more specifically, of the device 16 for transporting a joined mold 18, is described below.

The system 10 for aiding comprising the device 16 for transporting is intended especially, although not exclusively, to be deployed in order to undertake the replacement of the mold 18 of a molding unit 12 of the type with book-like opening.

Figure 1:
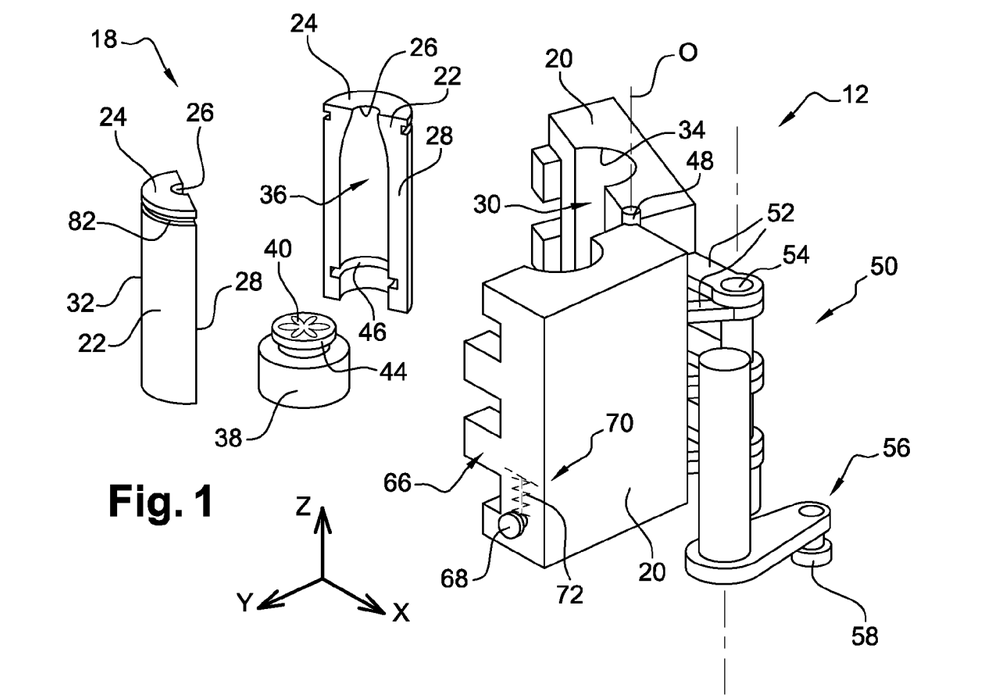
FIG. 1 is a perspective view which depicts schematically a molding unit of the type with book-like opening of a machine for manufacturing containers, and which illustrates a molding unit in the open position and separately, in an exploded view, a mold for the container comprising two molding elements and a mold bottom.

FIG. 1 depicts an illustrative embodiment of a molding unit 12 of the type with book-like opening intended to equip a machine 14 for manufacturing containers, in particular by forming a preform made from a plastic material.

Such a molding unit 12 with book-like opening is intended to be mounted on a carousel 15 of a machine 14 of the "rotary" type for manufacturing containers, of which the said unit 12 then constitutes one of the "n" molding units of the machine.

Figure 5:
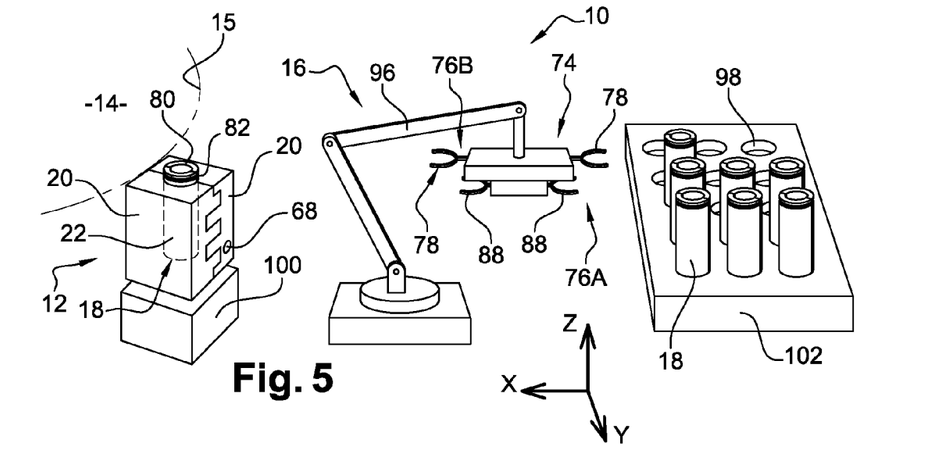
FIGS. 5 to 10 are perspective views which depict a molding unit and a system for aiding in the replacement of a mold comprising a transporting device which comprises a head according to FIG. 4 associated with a robotic arm for the purpose of positioning the handling means, and which illustrate the principal stages following one another in order to accomplish the replacement of a mold of the molding unit with the said system for aiding.

The "n" molding units 12 are distributed circumferentially in a regular manner on the carousel (depicted by a dash-dotted line in FIG. 5 and the following figures).

Preferably, the forming of the container is obtained by blowing or by stretch blow-molding of a preform utilizing by means of at least one fluid under pressure, such as air.

In order to do this, the preform is thermally conditioned beforehand in an oven, situated adjacent to the manufacturing machine 14, in order to soften its constituent material by heating in particular by means of infrared radiation lamps.

The molding unit 12 is supported, for example, by a bracket (not illustrated), which, by forming a frame, is intended to be secured to the carousel 15 of the machine 14, and which likewise supports associated means of forming (not illustrated) such as a blow nozzle.

Preferably, the blow nozzle is arranged vertically above the molding unit 12, when the preform is oriented with its neck at the top, and it comprises means for blowing which are mounted movably in the vertical sense in relation to the molding unit 12.

The molding unit 12 comprises at least two mold carriers 20, which are mounted movably between at least one open position and one closed position of the molding unit 12.

Figure 2:
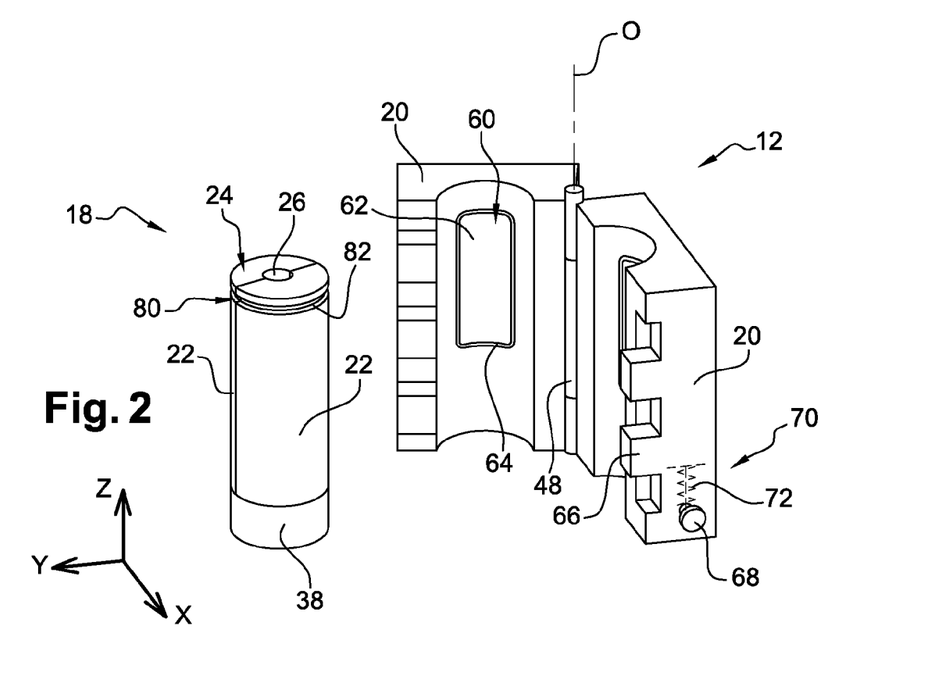
FIG. 2 is a perspective view which depicts the molding unit according to FIG. 1, and which illustrates the mold in the joined position, the molding elements enclosing the mold bottom, in order to form a transportable unit subassembly known as a joined mold.
Figure 3:
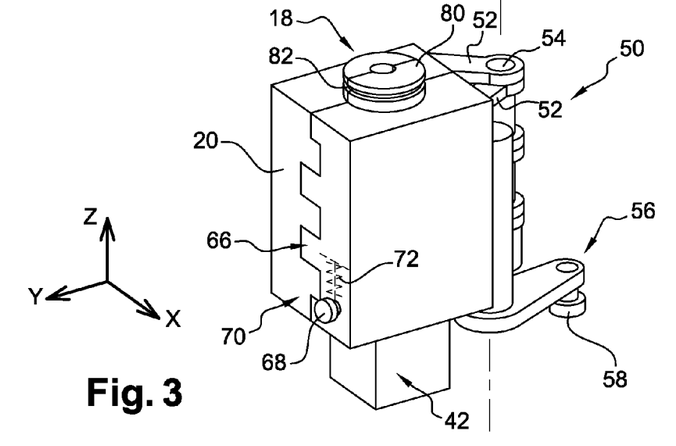
FIG. 3 is a perspective view which depicts the molding unit in FIG. 1 in the closed position and a mold in the interior of the mold carriers occupying the joined position.

The molding unit 12 is of the type with book-like opening, and the mold carriers 20 constitute supporting structures, each of which is mounted pivotably about an axis O of rotation, which axis O of rotation exhibits vertical orientation according to the trihedron (X, Y, Z) in the example illustrated in FIGS. 1 to 3.

As an alternative, only one of the mold carriers 20 is mounted movably, whereas the other mold carrier is fixed, the movable mold carrier alone being controlled as it travels between the open and closed positions of the molding unit 12.

The molding unit 12 comprises a detachable mold 18 comprising at least two molding elements 22 capable of being brought together in order to occupy a joined position, or of being moved apart in order to occupy a disjoined position.

In the operating mode, known as the production mode, of the machine 14, that is to say when the mold 18 is utilized for the manufacture of the container, the mold 18 then occupies successively one or other of the said disjoined positions and joined positions in the course of the manufacturing cycle, respectively being the disjoined position for the introduction of the preform or for the removal of the container obtained and the joined position during molding.

The mold 18 comprises an uppermost part comprising an upper face 24, against which the forming means, for example a blow nozzle, are intended to come to bear, including sealing of the same, the said planar upper face 24 being formed by the bringing together into the joined position of two molding elements 22.

The mold 18 comprises an opening 26 which opens centrally in the face 24 and which, in the joined position of the mold 18 and during manufacture, is intended to permit the body of the preform introduced into the mold 18 to extend in the interior of the mold 18, whereas the neck in its definitive form extends outside.

In fact, it will be recalled that, when forming takes place by blowing or by stretch blow-molding, the fluid under pressure is introduced into the preform that has been thermally conditioned at the neck, the said neck exhibiting its final form, that is to say that of the neck of the container.

In the illustrative embodiment depicted in FIGS. 1 to 3, the mold 18 exhibits a cylindrical form of generally circular section.

The mold 18 is divided into at least two molding elements 22, which elements respectively comprise a joint face 28 extending in a plane having a vertical orientation.

In the joined position of the mold 18, as depicted in FIG. 2 or 3, the said at least two molding elements 22 are brought together in such a way that the joint faces 28 of each molding element 22 are in contact one with the other and define a parting line of the mold 18, in this case having a vertical orientation and extending in the longitudinal direction.

Each mold carrier 20 comprises a housing 30 exhibiting a complementary form to that of the received molding element 22.

According to the illustrative embodiment, the molding element 22 comprises an external wall 32 opposite the joint face 28, and the housing 30 comprises a complementary wall 34, the said walls 32 and 34 being respectively convex and concave and of semicircular form.

As depicted in FIG. 1, each of the said at least two molding elements 22 of the mold 18 is provided with a half-cavity 36 corresponding to the container to be manufactured, for example a bottle in the present case, each of the half cavities 36 being configured as a hollow in the joint face 28.

However, when the container to be manufactured exhibits a complex mold bottom, in particular petaloid, it is known that problems of demolding are then likely to arise. It is for this reason that a separate mold bottom 38 is advantageously provided.

Preferably, and according to the illustrative embodiment, the mold 18 respectively comprises three distinct elements, namely two molding elements 22 and a mold bottom 38 comprising a cavity 40 for the bottom of the container to be manufactured, the cavity 40 of the mold bottom 38, when brought together with the half cavities 36 of the molding elements 22, determining the form of the container.

For such a mold 18, the molding unit 12 comprises means 42 for supporting the mold bottom 38, the said means being visible in FIG. 3 and comprising means for securing the mold bottom 38 and means for fluid connection, in particular in order to ensure functions such as cooling of the bottom or aiding with the release of the bottom in conjunction with demolding at the end of the manufacturing cycle for the containers.

Such means 42 associated with the mold bottom 38, also referred to as a "saddle", are familiar from the prior art and are accordingly not described in detail here, although reference can be made to document WO-2008/00938 by way of example without limitation.

In the joined position, the mold bottom 38 is intended to be tightly enclosed between the molding elements 22 to which the mold bottom 38 is then connected and positioned by positive engagement.

In order to do this, the mold bottom 38 comprises, for example, a male section 44, such as an annular rib, which is accommodated in the joined position of the mold 18 in a complementary female section 46, such as a groove realized in each molding element 22.

As an alternative, the mold 18 does not include such a mold bottom 38, and the mold 18 then consists uniquely of the two mold elements 22.

Furthermore, regardless of whether the mold 18 is executed in two or three elements (with a mold bottom 38), the design of the two molding elements 22 is similarly likely to vary.

As explained previously, and as depicted in simplified form in FIGS. 1 to 3, the molding element 22 is executed in the form of a mold half accommodated in the housing 30 of the associated mold carrier 20.

As an alternative, the mold element 22 is divided into two part and has a design identical to that described, for example, in document EP-B1-0.821.641, that is to say it is executed in two distinct pieces, these being respectively a shell comprising a part of the cavity that is intended to be mounted and secured by securing means in a housing of a shell carrier. The shell carrier itself is intended to be mounted and secured by other securing means to the mold carrier 20.

As a consequence, the expression "molding element" is used in a generic sense in the present description and in particular includes the different alternative embodiments of a mold 18 described above.

The molding unit 12 comprises, situated at the rear in the longitudinal direction, means 48 of articulation of the mold carriers 20 forming a hinge by means of which each mold carrier 20 is pivotably mounted about an axis O of rotation.

Each mold carrier 20 is controlled as it rotates about the axis O and is caused to pivot by means of a device 50 for opening and closing the molding unit 12.

The device 50 for opening and closing the molding unit 12 comprises, for example, control rods 52, of which one extremity is attached to one or other of the mold carriers 20, and of which the other extremity is connected so as to pivot freely on a common axis 54 of articulation which is arranged longitudinally behind the means 48 of articulation of the molding unit 12.

By bringing an influence to bear via means 56 of actuation connected to the common axis 54, one or other of the mold carriers 20 is caused by the control rods 52 either to move towards one another thereby closing the molding unit 12, or to move apart thereby opening the molding unit 12.

The mold carriers 20 are capable of moving apart one from the other by pivoting about the axis O of rotation determined by the means 48 of articulation, to be precise between at least the said closed and open positions of the molding unit 12.

The means 56 of actuation are realized, for example, in the form of a roller 58 intended in particular to interact with a complementary cam.

In a manner known per se, the manufacturing machine 14 comprises in particular such a cam for the purpose of the selective control, during the manufacture of containers, of the opening or the closing of each molding unit 12 as it travels around the circumference of the carousel 15.

Preferably, the means 56 of actuation comprise at least one lever associated with the roller 58 in order to form a displacement amplifier.

The device 50 for opening/closing the molding unit 12 is thus controlled by bringing an influence to bear selectively on the associated means 56 of actuation in order to bring about the displacement of the mold carriers 20 between the open and closed positions of the molding unit 12.

Reference should be made, for example, to documents FR-2.843.714 or FR-2.653.058 for more detailed information about the realization and the functioning of such a device 50 for opening/closing a molding unit 12.

Each of the said at least two molding elements 22 of the mold 18 is adapted to be secured in a detachable manner to one of the associated mold carriers 20 by associated securing means 60.

Advantageously, the securing means 60 are realized in accordance with French patent application FR-2.949.703 in the name of the applicant, and to which reference can be made for more detailed information.

According to one important characteristic, the associated securing means 60 are adapted to be controlled automatically, when the molding unit 12 is in the closed position, between at least one secured position and one released position, that is to say respectively between a released state and a secured state.

However, the aforementioned patent application FR-2.949.703 constitutes only one illustrative embodiment of securing means 60 for a molding unit 12, these being means which are adapted to be controlled automatically in a single operation and simultaneously for the molding elements 22.

As an alternative, the securing means 60 are realized with means of a mechanical type adapted to be controlled automatically between released positions and secured positions, the securing being obtained in particular by positive engagement between the male and female elements of the said securing means.

Thanks to the associated securing means 60, the molding elements 22 are capable, however, regardless of the open or closed position of the molding unit 12, of being released or secured simultaneously in relation to its associated mold carrier 20 and rapidly as soon as the change in position or state is obtained by a single operation of the controlled means associated with the securing means 60.

Thanks to such securing means 60, the said at least two molding elements 22 are released automatically in relation to the associated mold carriers 20 by controlling the associated means that are adapted to bring about the change in state or the displacement of the securing means 60 between the secured position and the released position, and vice versa.

Advantageously, the said at least two molding elements 22 are capable of being maintained in the said joined position by means intended to bring them together in order to form a transportable unit subassembly, known as a joined mold.

Thanks to such securing means 60, the said at least two molding elements 22 are capable of being released (or secured) in relation to the mold carriers 20 occupying the closed position of the molding unit 12, to be precise before or after the implementation of the means intended to bring them together temporarily in order to form a transportable unit subassembly, known as a joined mold.

Preferably, the means utilized to form the said joined mold are put in place after the release of the molding elements 22 in relation to the mold carriers 20, the said release being obtained by controlling the said securing means 60.

According to the design of the molding unit 12 and the mold 18 depicted in the figures, the associated securing means 60 are intended to secure each molding element 22 (or half mold) in a detachable manner in the housing 30 for the associated mold carrier 20.

According to the information contained in French patent application FR-2.949.703, the associated securing means 60 are controlled suction means (not illustrated) adapted to bring about, by vacuum effect, the securing of the molding element 22 (or half mold) against the wall 34 of the housing 30 of the associated mold carrier 20.

Such securing means 60 make it possible to accomplish the securing or the release of the molding elements 22 automatically and, as a result, rapidly and simply.

According to this document, the securing means 60 comprise suction means adapted to place under negative pressure an airtight chamber 62, which, being delimited by a seal 64, is arranged at the interface between each molding element 22 and the associated mold carrier 20, between the external wall 32 and the wall 34 of the housing 30.

Preferably, the suction means are controlled automatically in order to release or secure each molding element 22 simultaneously in relation to the mold carrier 20.

Advantageously, aiding with the release of the molding element 22 is capable of being obtained by inverting the direction of operation of the suction means in such a way as to place the airtight chamber 62 under positive pressure in order to guarantee the release of the molding element 22 in relation to the mold carrier 20 upon opening the molding unit 12 for the purpose of removing the previously established joined mold 18.

The expression negative pressure is used to denote a pressure lower than the atmospheric pressure conducive to the application of a sufficient force of attraction to maintain the molding element 22 secured to the mold carrier 20, and the expression positive pressure is used to denote a pressure greater than the atmospheric pressure in order to guarantee separation.

Preferably, the molding unit 12 comprises a device 70 for locking the molding unit 12 comprising at least means 66 for locking the mold carriers 20 and a control device 68 associated with the said means 66.

The locking device 70 is arranged in the front part of the mold carriers 20, that is to say longitudinally opposite the axis O of rotation and the device 50 for opening and closing the molding unit 12.

The locking device 70 is intended to ensure the locking of the two mold carriers 20 in the closed position, and it will be recalled by way of example that the final blow-molding pressures can reach values of 40 bar.

The locking device 70 comprises, for example, two half locks of the male type and the female type respectively, which are associated with the mold carriers 20 and are adapted to interact with one another in order to maintain the molding unit 12 in the closed position.

The function of the locking device 70 is, in particular, to prevent, in the production mode, any unauthorized opening in the course of forming operations, in particular by blowing or by stretch blow-molding.

The locking device 70 of the molding unit 12 comprises at least one device 68 for controlling the displacement of the locking means 66 which are mounted movably between:
  a locked position, in which the mold carriers 20 of the molding unit 12 are maintained in the closed position by the said locking means 66, and
  an unlocked position, in which the mold carriers 20 are free to be displaced between the closed position and the open position of the molding unit 12.

The control device 68 is constituted, for example, by a roller carried on a sliding shaft, as depicted schematically by a broken line in the figures, in order to control the means 66 for locking of the locking device 70 between the said locked and unlocked positions.

Advantageously, the locking device 70 comprises elastic return means 72 (depicted schematically by a broken line in the figures), which are adapted to return the locking means 66 automatically towards the locked position.

For more detailed information about the construction and the function of such a locking device 70, reference can be made to document FR-2.646.802 describing an example of a lock for a molding unit 10.

Described below is a preferred embodiment of the system 10 for aiding, and in particular the device 16 for transporting a joined mold 18 used in order to perform the replacement of a mold in a molding unit 12 of the type with book-like opening, as described with reference to FIGS. 1 to 3.

According to the invention, the machine 14 comprises a system 10 for aiding in the replacement of a mold comprising at least one device 16 for transporting a mold 18, known as a joined mold 18.

By definition, a joined mold 18 is constituted when the said at least two molding elements 22 are maintained in the said joined position by means intended to bring them together in order to form a transportable unit subassembly.

Advantageously, the molding elements 22 of the mold 18, with or without a mold bottom 38, then temporarily form a compact block, of which the elements joined by the said means are not able to be separated, in particular during the displacements which occur in the course of the replacement of a mold.

The transport device 16 comprises at least one head 74, which comprises handling means 76 adapted to interact with at least one joined mold 18 in such a way as to undertake the removal of a joined mold from mold carriers 20 occupying the open position of the molding unit 12, and/or the introduction of a joined mold between the said mold carriers 20 occupying the open position of the molding unit 12.

Advantageously, the system 10 for aiding in the replacement of a mold is adapted to be placed selectively in an operating state, which is associated with an operating mode, known as the intervention mode, of the manufacturing machine 14, the said intervention mode being intended, in particular, to permit the replacement of molds in all or part of the molding units 12 of the machine 14 for manufacturing containers to be undertaken.

The machine 14 is then at a standstill in the sense that the production of containers ceases during such an intervention mode, so long as the carousel 15 remains capable of being caused to rotate, in particular in order to bring one of the molding units 12 into a predetermined reference position with a view to undertaking the replacement of the mold 18 of the said unit 12 in an automated manner thanks to the system 10 for aiding according to the invention.

The system 10 for aiding in the replacement of a mold is also adapted to be placed selectively in a standby state, which is associated with an operating mode, known as the production mode, of the machine 14 for manufacturing containers, in the course of which the system for aiding is not utilized and does not interfere with the machine 14 for manufacturing containers.

The handling means 76 comprise at least one principal holding device 78 intended to interact with a first part 80 of the joined mold 18 which is accessible to the said principal holding device 78 when the molding unit 12 is in the closed position.

The principal holding device 78 is selected to ensure at least the holding function of the joined mold 18 during operations for the removal or introduction and, more generally, during transport of the said joined mold 18, for example between the molding unit 12 and the means for storage of such a joined mold 18.

Preferably, the said at least one principal holding device is constituted by a principal gripper 78, in this case in an upper position, adapted to take hold of the said first part 60 of the joined mold 18.

Advantageously, the principal gripper 78 constitutes a device, which is not only adapted to ensure the aforementioned function of holding the joined mold 18, but is also adapted to ensure the function of holding together, temporarily, at least the molding elements 22 for forming the transportable unit subassembly, that is to say the joined mold 18.

Preferably, the means intended to bring together the said at least two molding elements 22 in order to form the mold 18 are thus constituted by at least the principal gripper 78.

Advantageously, the said first part 80 of the joined mold 18 is constituted by the uppermost part of the mold 18 comprising the upper face 24 and the central opening 26 for the neck of the preform.

It is for this reason that the uppermost part 80 of the mold 18 is accessible to the principal device 78 while the molding unit 12 is occupying the closed position.

Advantageously, the first part 80 of the mold 18 projects from the molding unit 12 when the said unit 12 is occupying the closed position and comprises at least one complementary housing 82 of the principal holding device 78.

Holding by the principal gripper 78 of the uppermost part 80 of the mold 18 is thus facilitated and simplified thereby and is achieved rapidly as a result.

The principal holding gripper 78 comprises at least two jaws 84, which are mounted movably between at least:
  a first position, referred to as the active position, in which the jaws 84 are moved towards one another in order to interact with the corresponding part 80 of the joined mold 18;
  a second position, referred to as the passive position, in which the jaws 84 are moved apart in order to permit the engagement or the disengagement of the jaws 84 in relation to the corresponding part 80 of the joined mold 18.

In the active position, the jaws 84 of the principal gripper 78 are received in and penetrate advantageously into the housing 82.

Advantageously, the jaws 84 of the principal gripper 78 exerts a tightening force on the part 80 of the mold 18, and in this case the force is applied more precisely perpendicularly to the parting line, that is to say in the transversal direction, in such a way as to guarantee the maintenance of the molding elements 22 in the joined position.

Preferably, at least one of the said jaws 84 of the principal holding gripper 78 is mounted movably, between the said first and second positions, in a translational movement in relation to the other jaw, the displacement taking place globally in a transversal direction.

As an alternative, at least one of the said jaws 84 of the principal holding gripper 78 is mounted movably, between the said first and second positions, in a rotational movement about a vertical orientation axis.

Advantageously, the two jaws 84 of the principal holding gripper 78 are mounted in this case so that they are able to slide between the said first and second positions with the help of means 86 of support, which are secured in relation to the head 74 of the transport device 16.

As an alternative, the principal holding gripper 78 is mounted movably in relation to the head 74 of the transport device 16, for example in rotation and/or in translation between at least one retracted position and one advanced position.

The housing 82 is executed, for example, in the form of a circular groove extending circumferentially for all or part of the uppermost part 80 of the mold 18.

Advantageously, the jaws 84 penetrate at least partially into the groove 82, and a portion of the uppermost part 80 of the mold 18 overhanging the said groove 82 interacts preferably with the upper face of the jaws 84, which, regardless of the application of a tightening force, supports the weight of the mold 18.

During displacements performed in the course of the replacement of a mold, the joined mold 18 is suspended from the principal device 78.

Preferably, the handling means 76 comprise at least one secondary holding device 88 intended to interact with a second part 90 of the joined mold 18, which is accessible only when the molding unit 12 is in the open position.

The second part 90 of the mold is displayed in FIG. 4 by means of dots and is advantageously situated vertically between the middle and the lower part of the mold 18, below the center of gravity.

Advantageously, the said at least one secondary holding device is constituted by a secondary gripper 88, referred to as the lower gripper, adapted to take hold of the said second part 90 of the joined mold 18.

The secondary gripper 88 provides the possibility of ensuring supplementary holding of the joined mold 18 as soon as the principal gripper 78 interacting with the uppermost part 80 of the mold is moved apart from the center of gravity of the mold.

The secondary gripper 88 also provides the possibility, however, of preventing any moving apart of the molding elements 22 in the vicinity of the lower part of the joined mold 18, especially when the mold 18 is of the type comprising a mold bottom 38.

The secondary holding gripper 88 comprises at least two jaws 92, which are mounted movably between at least:
  a first position, referred to as the active position, in which the jaws 92 are moved towards one another in order to interact with the corresponding second part 90 of the joined mold 18;
  a second position, referred to as the passive position, in which the jaws 92 are moved apart in order to permit the engagement or the disengagement of the jaws 92 in relation to the corresponding second part 90 of the joined mold 18.

Advantageously, the jaws 92 of the secondary gripper 88 exerts a tightening force on the part 90 of the mold 18, in such a way as to maintain the molding elements 22 in the joined position.

Preferably, the principal gripper 78 and the secondary gripper 88 exert a tightening force and, in so doing, constitute the said means permitting the formation of a transportable unit subassembly, that is to say the said joined mold, by holding together at least the molding elements 22, with or without a mold bottom.

As an alternative, a single gripper 78 forming the handling means 76 exerts such a force on the mold 18.

Advantageously, the tightening force applied by the jaws 92 of the secondary gripper 88 is applied orthogonally to the parting line of the mold 18 in such a way as to press each of the joint faces 28 of the molding elements 22 one against the other.

When the mold 18 comprises a mold bottom 38, the mold bottom 38 is then immobilized by positive engagement between its male part 44 (rib) and the female part 46 (groove) of each molding element 22, and it is then adapted to be transported as a whole together with the molding elements 22.

As an alternative, although not illustrated here, when the mold bottom does not comprise means of positive engagement of the rib 44/groove 46 type, supplementary means adapted to maintain the mold bottom in position, in particular for the purpose of its transport, are advantageously provided.

Preferably, at least one of the said jaws 92 of the secondary holding gripper 88 is mounted movably, between the said first and second positions, in a translational movement in relation to the other jaw, the displacement of the jaws 92 taking place in a transversal direction.

As an alternative, at least one of the said jaws 92 of the secondary holding gripper 88 is mounted movably, between the said first and second positions, in a rotational movement about a vertical orientation axis.

The form of the jaws 92 of the secondary gripper 88, like the movement of opening/closing the jaws 92 in order to occupy the first active position or the second passive position, is more particularly determined in relation to the position occupied by the joined mold 18 when the jaws 92 of the gripper are about to enclose or move way from the part 90 of the mold.

Preferably, the jaws 92 are mounted movably in translation and possess, at least for one of them, a profile and a designed form (see FIG. 4), whereby the jaws 92 present a small size in particular in the transversal direction, due to the fact that the molding unit 12 of the type with book-like opening in the open position constitutes a cramped working environment for positioning the secondary gripper 88.

Advantageously, the two jaws 92 of the secondary holding gripper 88 are mounted in this case so that they are able to slide between the said first and second positions with the help of means 94 of support.

Advantageously, the secondary holding gripper 88 is mounted movably in relation to the principal holding device 78, in such a way as to be capable of separating the grippers 78 and 88 one in relation to the other in the longitudinal direction.

Preferably, the principal gripper 78 being secured in relation to the head 74, the secondary holding gripper 88 is mounted movably in this case in relation to the head 74 of the transport device 16.

The means 94 of support for the secondary holding gripper 88 are mounted movably in relation to the head 74, for example, and are adapted to slide in the longitudinal direction, that is to say from front to back and vice versa.

Advantageously, the secondary holding gripper 88 is capable of being displaced freely towards the first active position, without displacement of the head 74 of the transport device 16 occupying a predetermined position, and thus regardless of the principal gripper 78 and the active or passive position occupied by the said principal gripper 78.

The secondary holding gripper 88 is mounted movably between:
- a retracted position, in which the secondary gripper is retracted longitudinally in relation to the principal holding gripper 78;
- an advanced position, referred to as the working position, in which the secondary holding gripper 88 is adapted to interact with the second part 90 of the joined mold.

All contact between the secondary holding gripper 88 and the mold carriers 20 is avoided when the molding unit 12 is open after having been placed in the first active position of the principal holding gripper 78, that is to say in the case in which the principal holding gripper 78 constitutes at least one part of the said means intended to bring together the said at least two molding elements 22 in order to form the joined mold.

Advantageously, the secondary holding gripper 88 is adapted to be controlled selectively in displacement between the said retracted and advanced positions.

As an alternative, the secondary holding gripper 88 is mounted movably between the said retracted and advanced positions according to a movement other than sliding in the longitudinal direction, for example in rotation.

Preferably, the upper principal gripper 78 and/or the lower secondary gripper 88 are grippers which are controlled selectively in respect of their opening and closing.

As an alternative, opening of the gripper 78, 88 is achieved by engaging the jaws by force around the corresponding part of the mold 18 in such a way as to bring about its separation against elastic means for returning the jaws towards the first active position. Preferably, the elastic return means are separate from the jaws, and as an alternative the elastic return means are constituted by the jaws themselves.

Advantageously, the means intended to bring together the said at least two molding elements 22 in order to form the joined mold 18 are constituted by the handling means 76, that is to say the principal device 78 and/or the secondary device 88.

The handling means 76 thus ensure a double function, being firstly the function of the means enabling the forming of the joined mold 18, and then the function of means ensuring the gripping of the said joined mold 18 in order to permit its handling and especially its transport at the time of replacing the mold.

Thanks to such means, once the said at least two molding elements 22 have been released from the mold carriers 20 by controlling the securing means 60 to move towards the release position, the said at least two molding elements 22 (whether or not tightly enclosing a mold base 38) form the joined mold 18, that is to say a unit subassembly that is transportable by the head 74 of the transport device 16.

As an alternative, the means intended to bring together the said at least two molding elements 22 in order to form the joined mold 18 are constituted by means separate from the handling means 76 such as means for the temporary blocking of the molding elements 22.

According to such an alternative, the blocking means preferably interact with the part 80 of the mold 18, and the blocking means are selected in order to permit them to be positioned automatically without the intervention of an operator.

By comparison with such an alternative, the preferred embodiment of the invention, according to which the means intended to bring together the said at least two molding elements 22 in order to form the joined mold 18 are formed by the principal gripping device 78 and/or the secondary gripping device 88, has the advantage of not requiring supplementary means in order to ensure the sole function of forming the joined mold.

As a result, the transport device 16 of the system is adapted to undertake the replacement of the mold in a more rapid manner, due to the reduction in the number of necessary operations.

Advantageously, the head 74 of the transport device 16 comprises handling means 76 which are duplicated.

Figure 4:
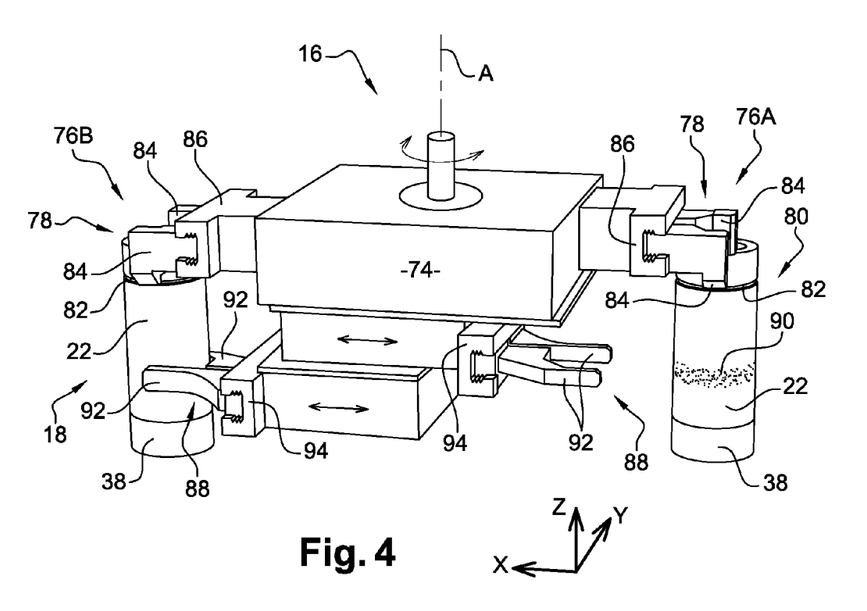
FIG. 4 is a perspective view which depicts the head intended to be associated with and interacting with the robotic arm of the device for transporting a joined mold comprising handling means according to a preferred embodiment of the invention.

As illustrated in FIG. 4, the head 74 comprises respectively first handling means 76A and second handling means 76B, which are identical and are arranged to either side of the head 74.

The said first and second handling means 76A, 76B respectively comprise a principal gripping device 78 and a secondary gripping device 88.

Advantageously, the head 74 is mounted movably in rotation about an axis A of rotation, in such a way as to be capable of presenting selectively one or other of the said first and second means 76A, 76B for handling a joined mold 18.

Thanks to the double handling means 76A and 76B, the operations for the removal and introduction of a joined mold 18 are capable of being undertaken immediately one after the other, the head 74 being able to comprise two joined mold 18.

By comparison, a head 74 equipped with a single pair of grippers 78 and 88 forming the handling means 76 would be unable to perform these same operations without the loss of time, given that at least one back-and-forth displacement of the head 74 is necessary in view of the inability to transport two joined mold 18 simultaneously.

In fact, once the removal of a joined mold 18 by the first means 76A for handling the head 74 has taken place, a simple rotation of the head 74 then permits the second handling means 76B carrying another joined mold 18 to be presented, facing towards the molding unit 12 in the open position.

Advantageously, the said other joined mold 18 has previously been taken up in order for the head 74 to be able to accomplish the introduction of the said other joined mold 18 immediately after removal.

Advantageously, the back-and-forth displacements of the head 74 of the transport device 16 are restricted in relation to the molding unit 12 and, by so doing, the time necessary for replacing the mold of a molding unit 12 is further reduced.

Preferably, the head 74 is mounted movably in space, according to at least two dimensions of the trihedron (X, Y, Z), advantageously according to the three dimensions of the trihedron (X, Y, Z).

In fact, the transport device 16 is then more flexible and is adapted to work with different types of molding unit 12, the displacements for accomplishing the introduction or removal being more or less complex in nature, in particular because of the larger or smaller distance between the mold carrier 20 in the open position of the molding unit 12.

Advantageously, the transport device 16 according to the invention comprises a robotic arm 96 adapted to interact with the head 74 in order to position the handling means 76 in relation to the molding unit 12 in order to carry out a mold replacement.

Such a robotic arm 96, preferably a "6-axis" robot, and as an alternative having at least "3 axes", is adapted to position the means 76 for handling the head 74 with precision in relation to the joined mold 18 in the three dimensions of the trihedron (X, Y, Z).

Advantageously, the jaws 84 of the principal gripper 78 exhibit, together with the housing 82, complementary forms adapted to guarantee, by mutual interaction, good positioning of the jaws 84, that is to say a centering function of the jaws 84 in relation to the housing 82 of the joined mold 18.

Advantageously, the use of the robotic arm 96 makes it possible to achieve very precise positioning in space of the handling means 76 and to carry out, together with the head 74 that is associated with it and transports at least one joined mold 18, the complex displacements attributable to the lack of space between the mold carriers 20 occupying the open position of such a molding unit 12 of the type with book-like opening.

The robotic arm 96 is, in fact, adapted to remove or arrange a mold 18 in a complementary housing 98 which comprises storage means associated with the device.

Preferably, the storage means for the molds 18 are capable of being displaced easily, whether or not in an automated manner, in order to be positioned in a zone determined in relation to the robotic arm 96 of the transport device 16 or in order to leave it.

As an alternative, the system 10 for aiding comprises two transport devices 16, each transport device 16 comprising a head 74 interacting with a robotic arm and which is provided with handling means 76.

Preferably, the two transport devices 16 are controlled successively one after the other in order to cause their head 74 to operate, for example in opposition, the first head 74 executing the removal of a joined mold 18, whereas the second head 74 takes hold of a new joined mold 18 to be put into service in the molding unit 12. Thus, when the second head 74 undertakes the introduction of the new joined mold 18 into the unit 12, the first head 74 divests itself of the removed joined mold 18.

Advantageously, each transport device 16 then works in hidden time in relation to the other transport device 16 in order to reduce the total time necessary to undertake the replacement of a mold in a molding unit 12.

As described previously with reference to FIGS. 1 to 3, the molding unit 12 comprises at least one device 50 for opening/closing the molding unit 12.

Preferably, the molding unit 12 likewise comprises a device 70 for locking the molding unit 12 comprising at least one control device 68 adapted to actuate the locking means 66 between the locked and unlocked positions.

Advantageously, the system 10 for aiding comprises an aiding module 100, which, when associated with the said transport device 16, comprises actuating means adapted to induce selectively at least the opening or the closing of the molding unit 10.

The aiding module 100 is arranged, for example, below the molding unit 12 in a predetermined zone of the manufacturing machine 14.

Preferably, the aiding module 100 of the system 10 comprises actuating means adapted to control selectively the locking means 66 of the locking device 70 between the said locked and unlocked positions.

Preferably, the aiding module 100 of the system is realized in accordance with the interpretation of French patent application FR-2.954.207 in the name of the applicant, and to which reference can be made for more detailed information in respect both of the construction and of the function of such an aiding module.

According to the interpretation of this document, the aiding module 100 comprises at least one actuating device intended to interact selectively with the control device 68 of the locking device 70, on the one hand, in order to bring about the displacement of the locking means 66 towards at least one of the said locked or unlocked positions and, on the other hand, in order to bring about the displacement of the mold carriers 20 towards one of the said open or closed positions of the molding unit 12.

As an alternative, the aiding module 100 comprises respectively first actuating means associated with the locking device 70 of the unit 12 and second actuating means, separate from the first actuating means, associated with the device 50 for opening/closing.

In such an alternative, opening or closing are preferably achieved by actuating the control device, such as the roller 58, of the device 50 for opening/closing in order to bring about the displacement of the mold carriers 20 of the molding unit 12 about the axis O of rotation.

In the absence of the locking device 70 of the molding unit 12, the aiding module 100 solely comprises actuating means adapted to control selectively the opening and the closing of the molding unit 12.

Thanks to the utilization of optimized securing means 60, such as controlled suction means, the operations for releasing or securing molding elements 22 to the mold carriers 20 are automated and are advantageously controlled without the need for the direct intervention of an operator on the molding unit 12.

In fact, the securing means 60 are controlled automatically between the securing and releasing positions or states, at the same time as the molding unit 12 is in the closed position.

Advantageously, the system 10 for aiding in the replacement of a mold comprises a transport device 16 and an aiding module 100, thanks to which automation of these operations in their entirety is achieved in return for a significant reduction in the total time required for replacing a mold of a molding unit 12.

In fact, the aiding module 100 facilitates the automation of at least the operations for opening and closing the molding unit 12 and in addition, where appropriate, the unlocking operations preceding opening (or the locking operations following closing) when the molding unit 12 comprises a locking device 70.

Advantageously, the transport device 16 and the means 76 for handling carried on a head 74 that is positioned by means of a robotic arm 96 make it possible, in combination with the securing means 60, to reduce the operations, which previously succeeded one another, required in order to undertake the disassembly or the assembly of the elements 22, 38 of the mold 18, to a single operation with a joined mold and, in so doing, to automate the operations for the removal or the introduction of such a joined mold 18.

Advantageously, the system 10 for aiding comprises a control unit (not illustrated) adapted to guide the controlled securing means, the means for actuating the aiding module 100 for controlling at least the opening and the closing of the molding unit 12 and the device 16 for transporting a joined mold 18, in particular the robotic arm 96, the movable head 74 and the handling means 76, respectively in synchronization.

Provided below, according to the preferred embodiment with reference to FIGS. 5 to 10, is a description of the function of such a system 10 for aiding in the replacement of a mold, whereby the whole of the operations necessary for the replacement of a mold of a molding unit 12 is entirely automated.

Advantageously, the system 10 for aiding comprises a control unit which guides in synchronization all of the means deployed in order to undertake the replacement of a mold in the molding unit 12, that is to say principally the securing means, the means for actuating the aiding module 100 and the transport device 16.

As illustrated in FIG. 5, the transport device 16 of the system 10 for aiding is in the standby state.

The manufacturing machine 14 is controlled in order to pass from the operating mode, known as the production mode, corresponding to the standby state of the device 16, to the operating mode, known as the intervention mode, corresponding to the state of use of the transport device 16 of the system 10 for aiding.

A molding unit 12 is positioned, by causing the carousel 15 to rotate, in a reference position determined in relation to the transport device 16 and to the aiding module 100.

The robotic arm 96 of the transport device 16 is guided by the control unit in order to ensure that the head 74 is positioned and takes hold of a mold 18 in a joined position already waiting in a housing 98 of the associated storage means 102.

Figure 6:
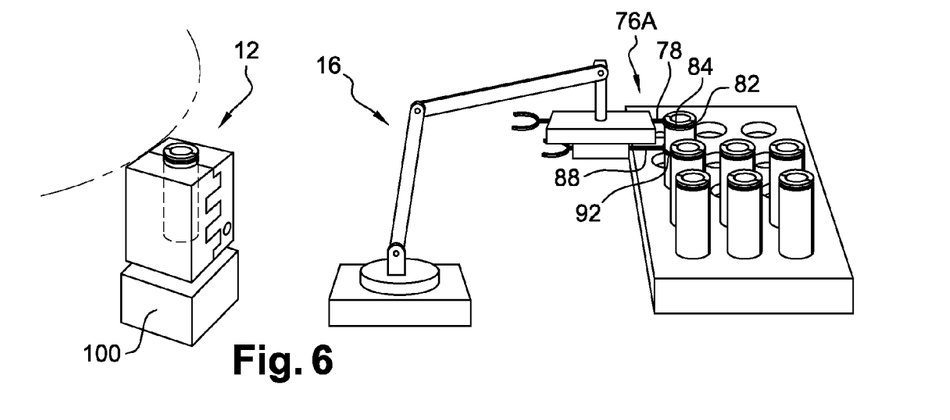

As illustrated in FIG. 6, a joined mold 18 is taken hold of by the handling means 76A of the head 74.

More specifically, the head 74 is positioned in relation to the mold 18 in such a way that the principal gripper 78, secure longitudinally in relation to the head 74, is able to take hold of the uppermost part 80 of the mold 18.

Once the principal gripper 78 is in position, the control unit controls the principal gripper 78 in order to bring about the displacement of the jaws 84 from the second inactive position, which have been occupied until now, towards the first active position.

The jaws 84 are then positioned in the housing 82 and, by the exertion of a tightening force advantageously on the molding elements 22, bring together the said at least two molding elements 22 in order to form the joined mold 18.

The secondary gripper 88 is likewise controlled in order to bring about its displacement from the retracted position towards the advanced position, and, to be precise, when the jaws 92 of the secondary gripper 88 occupy the second inactive position. Subsequently, once it is in position around the mold 18, the gripper 88 is controlled in order to bring about the displacement of the jaws 92 towards the first active position, in which the said jaws 92 preferably likewise exert a tightening force on the part 90 of the joined mold 18.

Figure 7:
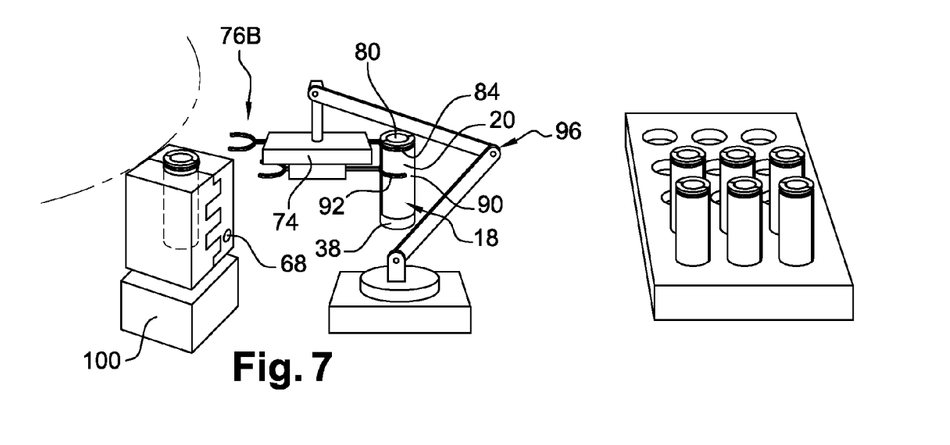

The robotic arm 96 is then controlled in order to remove the joined mold 18 from the housing 98 and is then displaced in order to position the head 74 as illustrated in FIG. 7, that is to say in such a way that the second handling means 76B of the head 74 are facing towards the molding unit 12 that had previously been positioned in the said reference position, and from which the replacement of the mold 18 will be undertaken.

The control unit then causes the robotic arm 96 to be displaced in order to position the head 74 in such a way that the principal gripper 78 is adapted to take hold of the part 80 of the mold which projects from the molding unit 12 occupying the closed position.

The jaws 84 of the principal gripper 78 are then controlled in order to be displaced from the first inactive position towards the second active position, in such a way that at least one part of the jaws 84 penetrate into the housing 82 and exert on a tightening force on the molding elements 22 in order to form a joined mold 18.

Figure 8:
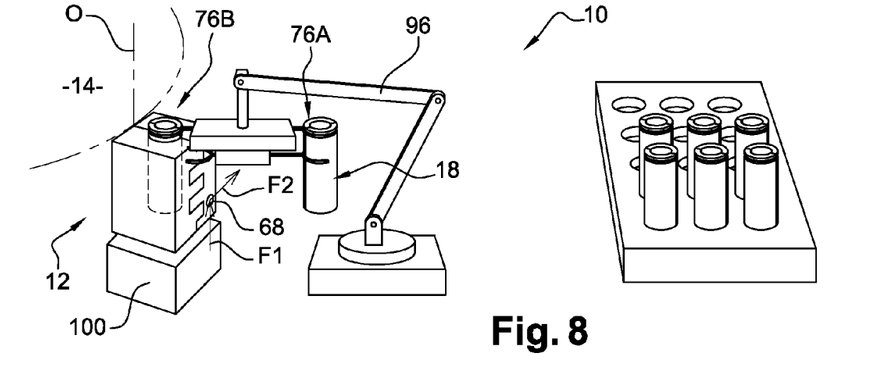

The principal gripper 78 then occupies the position illustrated in FIG. 8.

The control unit controls the securing means 60 in order to release the molding elements 22 occupying the joined position in the molding unit 12 in the closed position, the release being performed before or after the positioning of the jaws 84 of the gripper 78.

The control unit then controls the actuating means of the aiding module 100 in order first of all to bring about unlocking. Unlocking is achieved by the operating device of the module, which acts with a force F1 in the vertical direction, from bottom to top, on the control device 68 of the locking device 70 in order to bring about the displacement of the locking means 66 from the locked position to the unlocked position and, to be precise, against the elastic return device 72.

The operating device of the aiding module 100 then exerts a force F2 in the transversal direction on the control device 68, which brings about the opening of the molding unit 12.

Figure 9:
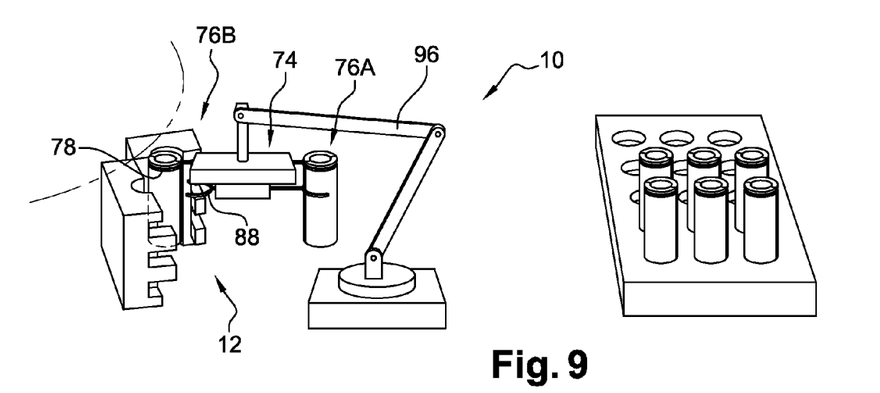

Thus, the mold carriers 20 pivot via the means 48 of articulation about the axis O of rotation until they arrive at the open position of the molding unit 12, as illustrated in FIG. 9.

Preferably, the aiding module 100 comprises complementary actuating means adapted to disconnect the means of support 42 (or the saddle) from the bottom 38 of the mold, as well as the fluid supply lines, in such a way as to cause the release of the bottom 38 of the mold that is tightly enclosed by the two molding elements 22.

Preferably, the joined mold 18 remains in position and is supported by the single principal gripper 78.

The secondary gripper 88 is then controlled in order to be displaced from its retracted position towards its advanced position, in order to position the jaws 92 around the part 90, and, once in position, the control unit controls the jaws 92 to be displaced from the inactive position towards the active position.

As an alternative, when the design of the molding unit 12 does not permit such positioning of the secondary gripper 88, or in order to gain time, the robotic arm 96 is controlled so that the head 74 undertakes the removal of the joined mold 18, and the positioning of the secondary gripper 88 is delayed until after the said removal of the joined mold 18 from the molding unit 12.

Figure 10:
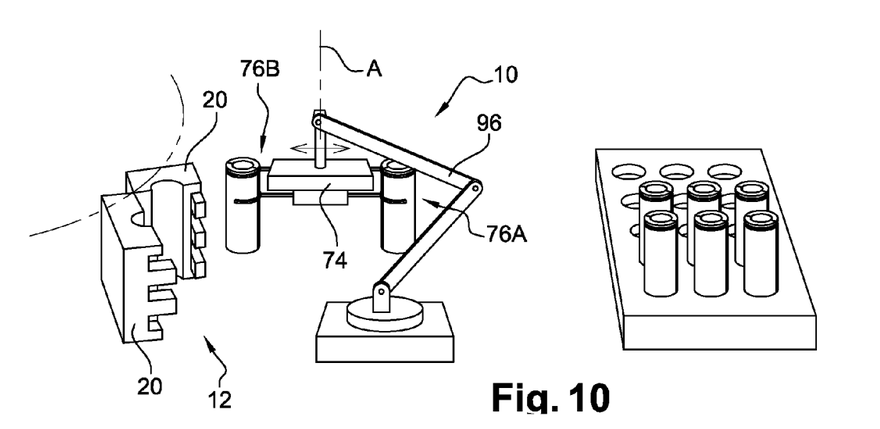

The transport device 16 then occupies the position illustrated in FIG. 10.

The control unit then controls the head 74 to rotate about the axis A in order to switch between the handling means 76A and 76B.

The joined mold 18, having been removed and being carried by the second handling means 76B, is thus displaced in order to present, facing the molding unit 12 occupying the open position, the other joined mold 18, that is to say the one advantageously taken up beforehand by the first handling means 76A (FIG. 6).

The first phase of the operations for the replacement of a mold is now complete, the joined mold 18 having been removed.

A second phase for the introduction of another joined mold 18 then commences, and in order to do this the control unit once more controls the various means of the system 10 for aiding, the stages previously described being carried out in the reverse order.

The control unit controls the robotic arm 96 in order for the head 74 to introduce the new joined mold 18 between the mold carriers 20 of the molding unit 12, the secondary gripper 88 then being displaced (if this has not taken place prior to the introduction) towards its retracted position after having previously controlled the jaws 92 from the first active position towards the second inactive position.

The control unit then controls the aiding module 100 and, more specifically, the operating device, in order to bring about closing of the molding unit 12 and its locking.

Locking is achieved automatically at the time of closing, since the means 66 of locking are advantageously released and are returned towards the locking position by the elastic return device 72.

The supporting means 42 are similarly returned to their position automatically in order to secure and connect the bottom 38 of the mold.

The control unit then controls the controlled means under negative pressure in order to establish inside the chamber 62 a negative pressure adapted to bring about the vacuum effect, thanks to which the securing of the molding elements 22 to the mold carriers 20 is achieved.

Before or after securing the molding elements 22, the principal gripper 78 is controlled by the control unit in order to displace its jaws 84 towards the second inactive position, and the head 74 is then displaced by the robotic arm 96, for example directly towards the position illustrated in FIG. 6, in order to proceed to take hold of a new mold 18 and to undertake the replacement of a mold of the following molding unit 12.

In the course of all the operations that have been described, the molding unit 12 remains motionless and occupies the predetermined reference position into which the unit 12 has been brought.

The invention claimed is:

1. A system for aiding in the replacement of a mold intended to be used for the replacement of at least one mold of a molding unit equipping a machine for manufacturing containers by the forming, by means of at least one fluid under pressure, of a preform made from a plastic material having been thermally conditioned beforehand, the system comprising:

said molding unit comprising at least:
two mold carriers which are mounted so as to be movable between at least one open position and one closed position of the unit, and
a mold comprising at least two molding elements configured to be brought together in order to occupy a joined position, or configured to be separated in order to occupy a disjoined position,
inside the molding unit, each of the at least two molding elements of the mold being configured to be secured in a detachable manner to one of the associated mold carriers by associated securing means, the associated securing means being configured to be controlled when the molding unit is in the closed position between at least one securing position and one release position; and
at least one device for transporting the mold forming a transportable unit subassembly, the transportable unit subassembly being a joined mold, the said transport device comprising
handling means comprising
at least one principal holding device configured to interact with a first portion of the joined mold to bring together the at least two molding elements of the mold to form the joined mold and to maintain the joined mold as joined, the first portion being accessible to the principal holding device when the molding unit is in the closed position, and
at least one secondary holding device configured to interact with a second portion of the joined mold which is accessible when the molding unit is in the open position, the at least one secondary holding device being mounted so as to be movable between at least one retracted position and one advanced position.

2. The system for aiding as claimed in claim 1, wherein the transport device comprises at least one head, which, in association with the robotic arm, comprises the handling means interacting with the joined mold in order to undertake the removal of the joined mold from the mold carriers in the open position of the molding unit, and/or the insertion of the joined mold between the mold carriers in the open position of the molding unit.

3. The system for aiding as claimed in claim 2, wherein the head of the transport device comprises double handling means which are formed respectively by first handling means and by second handling means.

4. The system for aiding as claimed in claim 3, wherein the head is mounted rotatably about an axis of rotation in such a way as to selectively position one or the other of the first means for handling or the second means for handling the joined mold at the time of operations for the replacement of the mold in the molding unit.

5. The system for aiding as claimed in claim 2, wherein the head of the transport device comprises double handling means which are formed respectively by first handling means and by second handling means.

6. The system for aiding as claimed in claim 2, further comprising a module for aiding, which, in association with the transport device, comprises means of actuation configured at least to selectively cause the opening or the closing of the molding unit.

7. The system for aiding as claimed in claim 1, wherein the at least one principal holding device is constituted by a principal gripper configured to take hold of the said first portion of the joined mold.

8. The system for aiding as claimed in claim 7, wherein the at least one secondary holding device consists of a secondary gripper configured to take hold of the said second portion of the joined mold.

9. The system for aiding as claimed in claim 8, wherein the head of the transport device comprises double handling means which are formed respectively by first handling means and by second handling means.

10. The system for aiding as claimed in claim 8, further comprising a module for aiding, which, in association with the transport device, comprises means of actuation configured at least to selectively cause the opening or the closing of the molding unit.

11. The system for aiding as claimed in claim 7, wherein the head of the transport device comprises double handling means which are formed respectively by first handling means and by second handling means.

12. The system for aiding as claimed in claim 7, further comprising a module for aiding, which, in association with the transport device, comprises means of actuation configured at least to selectively cause the opening or the closing of the molding unit.

13. The system for aiding as claimed in claim 1, further comprising a module for aiding, which, in association with the transport device, comprises first means of actuation configured at least to selectively cause the opening or the closing of the molding unit.

14. The system for aiding as claimed in claim 13, wherein the module for aiding the system comprises second means of actuation configured to selectively control a device for locking the molding unit between a locked and an unlocked position.

15. The system for aiding as claimed in claim 14, further comprising a control unit configured for synchronized guidance of the handling means of the robotic arm of the device for transporting of the joined mold and the means for actuating the module for aiding in order to realize the operations for the replacement of the mold in the molding unit in an automated manner.

16. The system for aiding as claimed in claim 13, further comprising a control unit configured for synchronized guidance of the handling means of the robotic arm of the device for transporting of the joined mold and the means for actuating the module for aiding in order to realize the operations for the replacement of the mold in the molding unit in an automated manner.

17. The system for aiding as claimed in claim 1, wherein the transport device further comprises at least one robotic arm for positioning, in space and with respect to the molding unit and along a trihedron, the means for handling the joined mold to carry out a replacement of the at least one mold of the molding unit.

18. The system for aiding as claimed in claim 17, wherein the head of the transport device comprises double handling means which are formed respectively by first handling means and by second handling means.

19. The system for aiding as claimed in claim 17, further comprising a module for aiding, which, in association with the transport device, comprises means of actuation configured at least to selectively cause the opening or the closing of the molding unit.

20. The system for aiding as claimed in claim 1, wherein the secondary holding device is movable relative to the primary holding device.

* * * * *